United States Patent [19]
Keech

[11] Patent Number: 5,860,735
[45] Date of Patent: *Jan. 19, 1999

[54] LIGHT GLARE REDUCING DEVICE

[76] Inventor: Charles A. Keech, 72 Red Lion Ave., Felton, Pa. 17322

[ * ] Notice: The term of this patent shall not extend beyond the expiration date of Pat. No. 5,526,179.

[21] Appl. No.: 545,336

[22] Filed: Oct. 19, 1995

Related U.S. Application Data

[63] Continuation-in-part of Ser. No. 279,487, Jul. 22, 1994, Pat. No. 5,526,179.

[51] Int. Cl.⁶ .............................. B60Q 1/00; F21V 7/04; F21V 9/00; F21M 3/14
[52] U.S. Cl. ........................... 362/507; 362/31; 362/255; 362/293; 362/487
[58] Field of Search ................................. 362/61, 32, 255, 362/268, 290, 342, 19, 293, 90, 297, 208, 205, 277, 31; D26/118; 116/272; 340/626; 359/601

[56] References Cited

U.S. PATENT DOCUMENTS

| | | | |
|---|---|---|---|
| D. 287,107 | 12/1986 | Bergeron et al. | D26/118 |
| 1,219,480 | 3/1917 | Perry | 362/61 |
| 1,260,439 | 3/1918 | Otte | 362/61 |
| 1,266,524 | 5/1918 | Otte | 362/61 |
| 1,272,509 | 7/1918 | Palmer | 362/342 |
| 1,735,209 | 11/1929 | Nelson | 362/342 |
| 2,031,045 | 2/1936 | Land . | |
| 2,123,901 | 7/1938 | Land | 359/500 |
| 2,185,000 | 12/1939 | Land . | |
| 2,237,565 | 4/1941 | Land . | |
| 2,297,240 | 9/1942 | Neumann | 362/61 |
| 2,433,503 | 12/1947 | Young . | |
| 2,539,937 | 1/1951 | Ramminger | 362/290 |
| 2,591,269 | 4/1952 | Lehoczki | 362/208 |
| 4,175,280 | 11/1979 | Plewka | 362/61 |
| 4,225,904 | 9/1980 | Linder | 362/61 |
| 4,286,308 | 8/1981 | Wolff . | |
| 4,499,846 | 2/1985 | Bergeron et al. | 116/272 |
| 4,538,213 | 8/1985 | Martin | 362/61 |
| 4,596,980 | 6/1986 | Bergeron et al. | 340/626 |
| 4,707,767 | 11/1987 | Bergin et al. . | |
| 4,858,083 | 8/1989 | Wakimoto | 362/208 |
| 4,944,125 | 7/1990 | Ito . | |
| 5,131,736 | 7/1992 | Alvarez . | |
| 5,262,902 | 11/1993 | Okumura et al. | 359/885 |
| 5,392,203 | 2/1995 | Harris, Jr. | 362/205 |
| 5,412,548 | 5/1995 | Yee | 362/277 |
| 5,526,179 | 6/1996 | Keech | 362/61 |

*Primary Examiner*—Sandra O'Shea
*Assistant Examiner*—Matthew J. Spark
*Attorney, Agent, or Firm*—Jeffrey L. Thompson; Thompson & Thompson, P.A.

[57] ABSTRACT

A light glare reducing device being all or partially constructed of light transmitting materials with light reflecting surfaces in different designs. When the light glare reducing devices or lenses are placed over lighting sources they reduce the high glare and blinding effects of the light sources. Increasing the light output of lighting sources when used with lenses can maintain the lighting level while reducing glare. When used for automotive usage alternative automotive headlights are used. The combined usage of the alternative headlights and the lenses provides roadway and side of the roadway lighting without high glare to oncoming vehicles, bicyclists, pedestrians and animals. The existing automotive headlight system can be maintained so that the high beam headlights can be used if necessary or desirable.

15 Claims, 4 Drawing Sheets

LIGHT GLARE REDUCING DEVICE

This application is a continuation-in-part of applicant's U.S. patent application Ser. No. 08/279,487 filed Jul. 22, 1994, now U.S. Pat. No. 5,526,179.

BACKGROUND

1. Field of the Invention

This invention relates to a new and improved light glare reducing device and more specifically a glare control device for illuminating vehicle pathways and other illumination.

BACKGROUND

2. Description of Prior Art

Headlight glare is a persistent safety hazard in night driving and over the years many systems have been proposed to suppress headlight glare.

In general, the prior art systems fall into two broad categories. In the first, polarizing filters placed over the headlights polarize the emitted light at a 45 degree axis and a similar polarizing filter is used as a visor through which the operator views the roadway. When a similarly equipped vehicle approaches, the light emitted there-from is crosspolarized with respect to the visor thereby reducing glare. For such a system to be effective, however, it must be adopted universally. Representative examples of the polarizing system may be found in U.S. Pat. Nos. 1,786,518; and 2,423, 321. Also see commonly assigned U.S. Pat. No. 2,458,179.

The second type of glare control system may be referred to as the strobe type. In the strobe system, the headlight is rapidly flashed on and off, either electrically by interrupting power or electromechanically by providing an oscillating or rotating shutter in front of the headlights, and the operator views the roadway through a visor that is rapidly switched between light transmissive and opaque states in synchronism with the headlights. The headlights operate above the eye flicker rate and generally are on for a very short portion of the headlight cycle. For example, the headlight may be turned on for 10 per cent of the cycle and be off for 90 per cent. The visor is transmissive while the headlight is on and then is rapidly switched to the opaque state while the headlight is off. Obviously, the light output of the headlight must be 10 times greater than normal to provide sufficient illumination. Because the visor is transmissive for only 10 per cent of the visor cycle, headlight glare from oncoming vehicles is reduced by 90 per cent. Despite the complexity of the strobe system, it has a major advantage in the fact that it need not be universally adopted to provide the benefit of glare suppression.

For representative examples of early strobe type systems, reference may be had to U.S. Pat. Nos. 2,131,888; 2,139, 707; and 2,755,700. A more contemporary version of the strobe type glare reduction system may be found in The National Highway Traffic Safety Administration Report PB-257-431 of September 1976 entitled "Advanced Headlighting Systems". The visor used in that system is of the electro-optical type, such as the PLZT shutter described in U.S. Pat. No. 3,245,315.

While both the polarizing and strobe type glare control systems are effective to reduce glare, the inherent light transmission losses of those systems generally tend to deprive the vehicle operator of the benefit of supplemental ambient illumination provided by streetlights especially when there is no vehicle approaching or when the glare intensity is relatively low from oncoming vehicles off in the distance.

The polarizing system described in the previously noted U.S. Pat. No. 2,230,262 addresses the problem by configuring the headlight and visor filters in venetian blind arrays that are switched between closed and opened positions in accordance with the glare intensity of the oncoming path as measured by a photoelectric glare level detector mounted on the front of the automobile. When the glare level is above a predetermined limit, the filters are closed for maximum glare reduction. When the glare intensity falls below the limit, the filters are opened to take advantage of ambient illumination. However, because this is a bistable system (the filters are either opened or closed) which does not adjust proportionally to variations in glare intensity, it would seem that the abrupt changes in perceived roadway illumination may prove tiring to the vehicle operator.

The strobe type systems in the prior art generally do not make any provision for varying the system response in accordance to glare intensity and the transmissive-to-opaque time ratio of the visor cycle is fixed to coincide with the light emitting and nonemitting intervals of the headlight cycle for maximum glare reduction.

The glare control system for reducing headlight glare from oncoming vehicles being of the type wherein the headlights are rapidly switched between light emissive and non-emissive states and the operator views the roadway through a visor operating in synchronism with the headlights and being switchable between light transmissive and opaque states could have technical difficulties when approached by two vehicles with different light emissive and non-emissive states.

Previous methods for reducing headlight glare have generally been complex.

Generally, previous glare reducing systems have no effect on headlight glare reflected by the vehicles mirrors from following vehicles.

The apparatus disclosed in U.S. Pat. No. 4,707,767 is a multiple light unit with that being the only similarity. There is no reference to glare reduction. No glare reducing lenses are incorporated. U.S. Pat. No. 4,707,767 is designed specifically to provide for improved aerodynamic performance of the motor vehicle using same and for ease of replacement of the modules employed therein, unrelated to glare reduction.

Automotive headlights over the years have been improved with better lighting for the driver and with each improvement for the driver it has brought with it more glare and blinding effects to approaching drivers.

Today headlight glare is still a persistent safety hazard in night driving despite the many systems that have been proposed over the years to suppress headlight glare indicating the systems are either technically unfeasible, impractible or unsound or lacking in commercial potential.

OBJECTS AND ADVANTAGES

Accordingly, several objects and advantages of my invention are:
  (a) to provide an improved construction and arrangement of parts for reducing glare from an automotive headlight system and similar sources of light in an efficient and economical manner.
  (b) to provide a means for diminishing or eliminating the glare from sources of illumination by interposing between a light source and the person viewing said source a diffusive light transmitting solid lens or lenses of a suspension solution or mixture of particle or substance suspending material.

(c) to provide a means in connection with a new automotive headlight system and the like for the projection of two light components from each headlight, one component being projected as that portion of the beam illuminating the roadway path of the vehicle, the other component being projected as a spread beam to illuminate the sides of the roadway.

(d) to provide a glare reducing means in connection with a new automotive headlight system and the like for the projection of a single beam of light of reduced size utilizing a funnel design to reduce a conventional light source to a much smaller diameter. The smaller funnel end or light projection end of the funnel and the lens incorporated could be of any size or any shape as the light source could be of any size or shape.

The lens and the light source or headlight could be of the same size and shape thus eliminating the funnel piece.

(e) to provide a manner in which headlight glare is substantially reduced, as the only components remaining visible to an approaching driver and his or her passengers is the soft, low-glaring components of the emitted beam.

(f) to provide adequate roadway illumination.

(g) to provide a wider field of light for more side of the road illumination.

(h) to provide more side of the road illumination to provide better vision for seeing bicyclists, pedestrians, animals and other objects.

(i) to provide glare reduction to oncoming vehicles traveling along an adjacent path.

(j) to provide glare reduction to oncoming vehicles traveling in any and all directions.

(k) to provide glare reduction to vehicles being followed because high glare will not be present to be reflected by the lead vehicle mirrors.

(l) to provide glare reduction to bicyclists, pedestrians and animals.

(m) to provide a low glare automotive headlight system to reduce for passing motorists the temporary blindness or impaired or restricted vision that occurs when passing a vehicle in the opposing direction with high glare headlights.

(n) to provide a low glare automotive headlight system that is self-contained, that does not require parts to be installed on other vehicles.

(o) to provide a low glare automotive headlight system that does not have to be used universally to be effective.

(p) to provide a low glare automotive headlight system where universal usage could be adapted over a period of time.

(q) to provide a low glare automotive headlight system that does not cause abrupt changes in roadway illumination.

(r) to provide a low glare automotive headlight system that utilizes no moving parts.

(s) to provide a low glare automotive headlight system that utilizes no electronic components.

(t) to provide a low glare automotive headlight system that utilizes no visors in the system.

(u) to provide a low glare automotive headlight system that the headlights do not have to be switched on and off constantly as in some previous systems.

(v) to provide a low glare automotive headlight system that the output of headlights used does not have to be increased 10–20 times as in some prior art.

(w) to provide a low glare automotive headlight system that is simple in its operation.

(x) to provide a low glare automotive headlight system that is relatively simple to install.

(y) to provide a low glare automotive headlight system that does not deprive the vehicle operator of the benefit of supplemental ambient illumination provided by streetlights or other sources of illumination.

SUMMARY OF THE INVENTION

The present invention provides an improved light glare reducing device usable on any automobile or other vehicle or other similar spot like illumination light or other illumination lights.

The present invention reduces headlight glare to oncoming vehicles traveling along an adjacent path of travel as well as any and all vehicles traveling in any and all other directions as well as to bicyclists, pedestrians and animals. These advantages are achieved according to the present invention, which comprises a light glare reducing device adapted to be placed in the path of light emitted from a light source. The glare reducing device includes a compartment with a plurality of light transmitting surfaces. The compartment substantially filled with a diffusive light transmitting solid lens or lenses of a suspension solution or mixture of particle or substance suspending material.

BRIEF DESCRIPTION OF THE DRAWINGS

The foregoing system is subject to considerable variation without departing from within the scope of the invention.

Additional objects and advantages will in part appear and in part be pointed out in the course of the following detailed description of certain embodiments of the invention, which are given as nonlimiting examples, reference should be had to the following detailed description taken in connection with the accompanying drawings in which.

Figure 1:
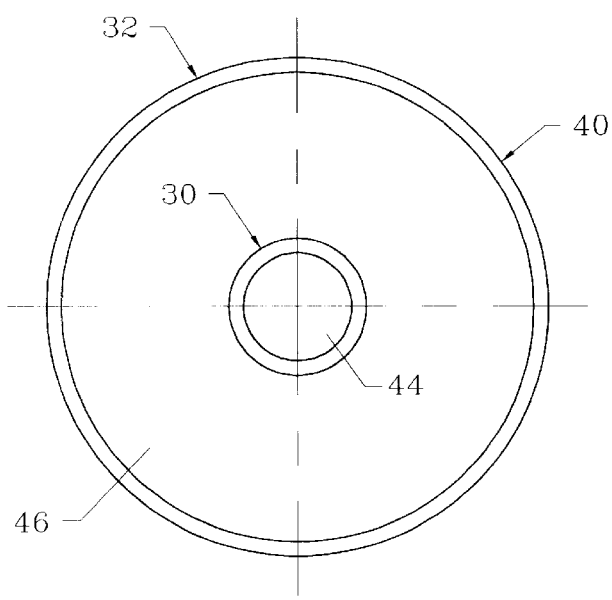
FIG. 1 shows a front view of a single unit of a prototype test model.

REFERENCE NUMERALS IN DRAWINGS 30 inner cylinder 32 outer cylinder
34 inner cylinder lens 36 outer cylinder lens
40 prototype test model unit
42 inner and outer cylinder rear plate
44 inner cylinder compartment 46 outer cylinder compartment
48 funnel-shaped body 52 headlight
54 light source end 60 light bulb
62 light reflector shield

DETAILED DESCRIPTION OF INVENTION

Figure 2:
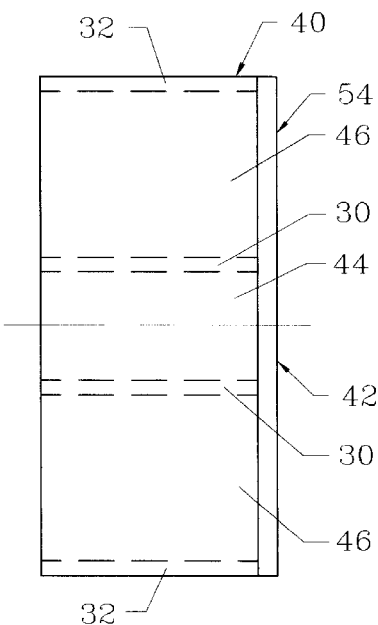
FIG. 2 shows sides, bottom and top views of a single unit of a prototype test model.
Figure 3:
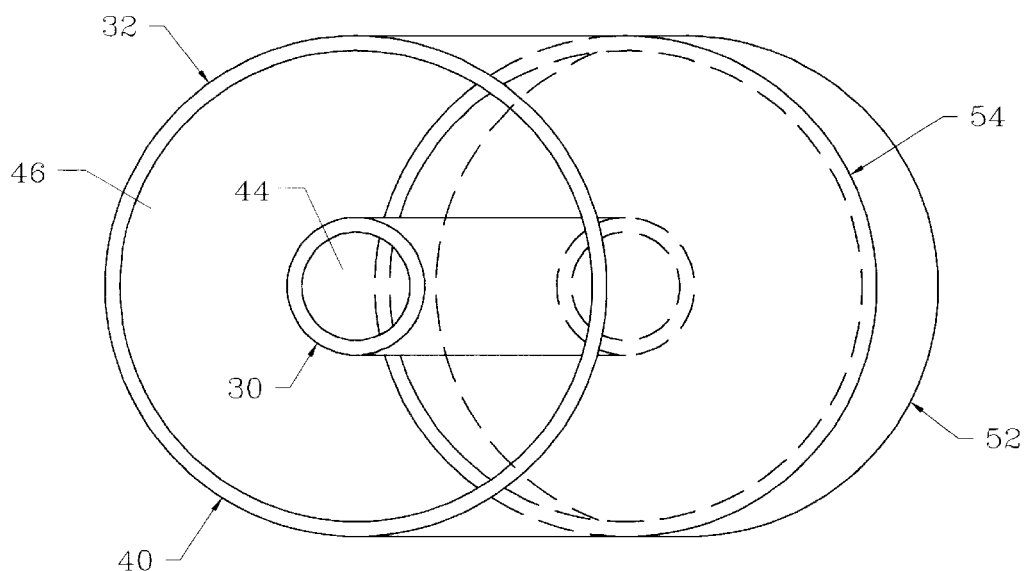
FIG. 3 shows a perspective view of a single unit of a prototype test model.

FIG. 1 shows a front view, FIG. 2 shows side, bottom and top views and FIG. 3 shows a perspective view of a single unit of prototype test model 40.

Inner cylinder 30 is a common two inch inside diameter white plastic or PVC water pipe. In prototype test model 40 inner cylinder 30 is three inches in length and is painted satin black on the inside and outside.

Outer cylinder 32 is a common six inch inside diameter green plastic or PVC sewer pipe. In prototype test model 40 outer cylinder 32 is three inches in length and is painted satin black on the inside.

Inner and outer cylinder rear plate 42 is a common piece of one-eighth inch thick clear light transmitting material (e.g., a common synthetic resin material such as PLEXIGLASS® can be used) cut in a circular shape and size fitting the outside diameter of outer cylinder 32.

The rear end of inner cylinder 30 is glued in a centered position to one side of inner and outer cylinder rear plate 42.

All glued areas should and must create a sealed tight joint if the lenses are molded in the inner or outer cylinders.

Outer cylinder 32 is glued, outside of inner cylinder 30, to the outer edges of inner and outer cylinder rear plate 42. Outer cylinder 32 is glued to the same side of inner and outer cylinder rear plate 42 as inner cylinder 30.

All glued areas should and must create a sealed tight joint if the lenses are molded in the inner or outer cylinders.

Inner cylinder lens 34 is made from a mixture of eight ounces of polyester resin with hardener or catalyst added, resin solution UN-1866 by Mahogany Co. of Mays Landing, Inc., 5450 Atlantic Ave., Mays Landing, N.J. or an equivalent, and one-quarter teaspoon of liquid concentrated ultra CHEER with advanced color guard free, a household laundry detergent made by Proctor & Gamble, Cincinnati, Ohio 45202 or equivalent. The mixture is mixed well, poured into a mold to a thickness of one and one-quarter inches and allowed to harden.

An alternative inner cylinder lens 34 is made from a mixture of eight ounces of polyester resin with hardener or catalyst added, resin solution UN 1866 by Mahogany Co. of Mays Landing, Inc., 5450 Atlantic Ave., Mays Landing, N.J. or an equivalent, and one-eighth teaspoon of liquid concentrated ultra CHEER with advanced color guard free, a household laundry detergent made by Proctor & Gamble, Cincinnati, Ohio 45202 or equivalent. The mixture is mixed well, poured into a mold to a thickness of two and three-quarter inches and allowed to harden.

An alternative inner cylinder lens 34 is made from a mixture of eight ounces of polyester resin with hardener or catalyst added, resin solution UN 1866 by Mahogany Co. of Mays Landing, Inc., 5450 Atlantic Ave., Mays Landing, N.J. or an equivalent and one-eighth teaspoon of liquid concentrated ultra CHEER® with advanced color guard free, a household laundry detergent made by Proctor & Gamble, Cincinnati, Ohio 45202 or equivalent. The mixture is mixed well, poured into a mold to a thickness of three and three-eights inches and allowed to harden.

The mold can be the inner cylinder 30 or the mold can be a separate mold and then the inner cylinder lens 34 placed in the inner cylinder 30.

Outer cylinder lens 36 is made from a mixture of eight ounces of polyester resin with hardener or catalyst added, resin solution UN 1866 by Mahogany Co. of Mays Landing, Inc., 5450 Atlantic Ave., Mays Landing, N.J. or an equivalent, and one-quarter teaspoon of liquid concentrated ultra CHEER® with advanced color guard free, a household laundry detergent made by Proctor & Gamble, Cincinnati, Ohio 45202 or equivalent. The mixture is mixed well, poured into a mold-to a thickness of two inches and allowed to harden.

The mold can be the outer cylinder 32 or the mold can be a seperate mold and then the outer cylinder lens 36 placed in outer cylinder 32.

Since certain changes may, can and will be made in the above solutions or diffusive light transmitting solid lens or lenses of a suspension solution or mixture of particle or substance suspending material without departing from the scope of the invention herein involved, it is intended that all matter contained in the above solution descriptions and solutions shall be interpreted as illustrative and not in a limiting sense.

Headlight 52 is placed at the rear end, light source end 54, of prototype test model 40 in such a way and manner that the illumination from headlight 52 is directed directly at and into the rear end, light source end 54. The illumination light from headlight 52 passes through inner cylinder compartment 44 and outer cylinder compartment 46.

Prototype test model 40 uses a 100 watt fog light as a headlight 52. Examples are a Wagner number 4537 and a GE number 4537-2 bulbs.

Since certain changes may, can and will be made in the above solutions or diffusive light transmitting solid lens or lenses of a suspension solution or mixture of particle or substance suspending material without departing from the scope of the invention herein involved, it is intended that all matter contained in the above solution descriptions and solutions shall be interpreted as illustrative and not in a limiting sense.

Figure 4:
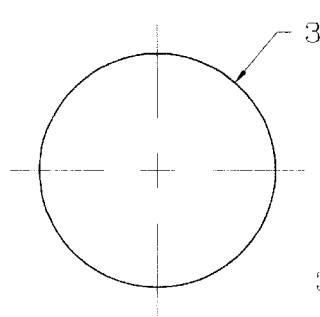
FIG. 4 shows a front view of an inner cylinder lens.
Figure 5:
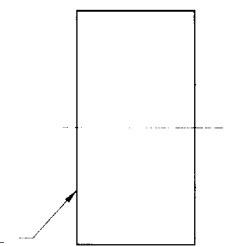
FIG. 5 shows sides, bottom and top views of an inner cylinder lens.
Figure 6:
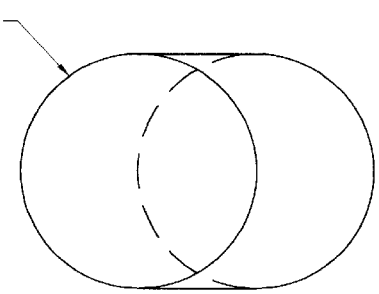
FIG. 6 shows a perspective view of an inner cylinder lens.

FIG. 4 shows a front view, FIG. 5 shows side, bottom and top views and FIG. 6 shows a perspective view of an inner cylinder lens 34.

Figure 7:
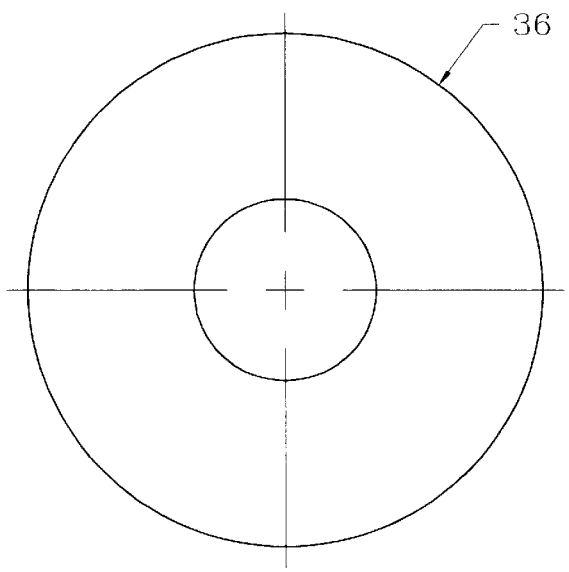
FIG. 7 shows a front view of an outer cylinder lens.
Figure 8:
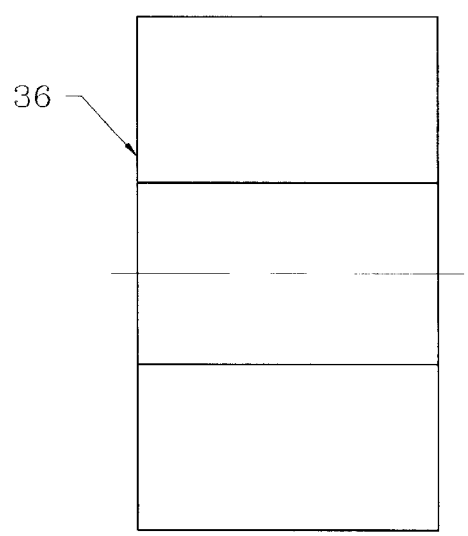
FIG. 8 shows sides, bottom and top views of an outer cylinder lens.
Figure 9:
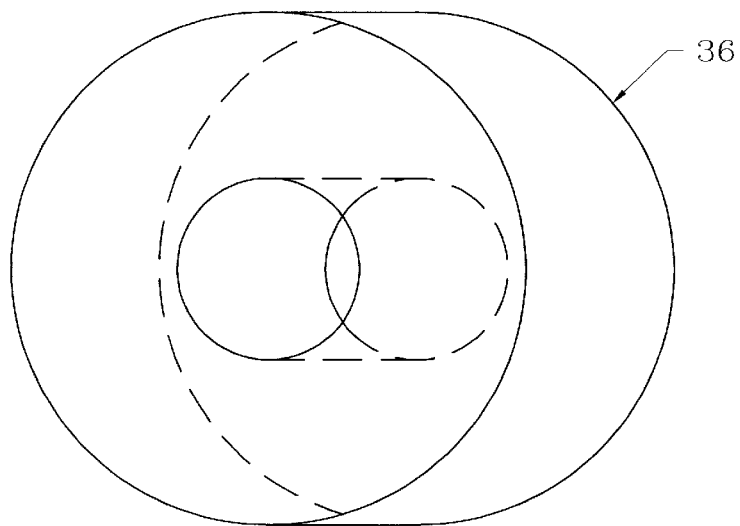
FIG. 9 shows a perspective view of an outer cylinder lens.

FIG. 7 shows a front view, FIG. 8 shows side, bottom and top views and FIG. 9 shows a perspective view of an outer cylinder lens 36.

Figure 10:
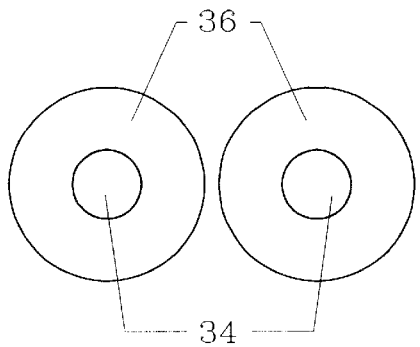
FIG. 10 shows a front view of a four unit prototype test model.
Figure 10:
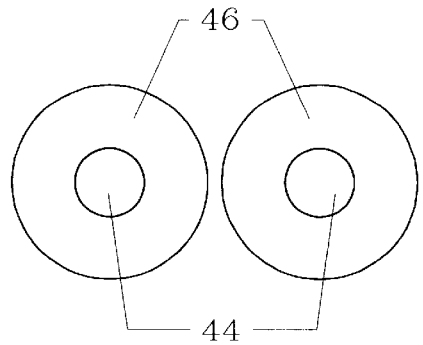

FIG. 10 shows a front view of the four unit prototype test model 40. The four unit prototype test model 40 consists of four single unit prototype test models 40 placed in a side by side manner to form a streight line of units.

Since certain changes may, can and will be made in the aforementioned without departing from the scope of the invention herein involved, it is intended that all matter contained in the above and the above number of single unit prototype test models 40 units shall be interpreted as illustrative and not in a limiting sense.

Figure 11:
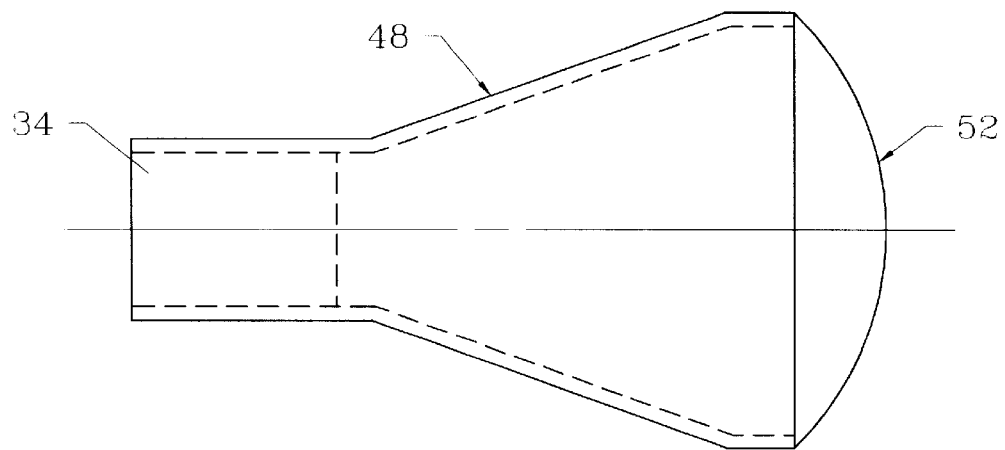
FIG. 11 shows a side, bottom and top views of a funnel shaped adaptation used to reduce the size of a conventional light source to a much smaller size or diameter.
Figure 12:
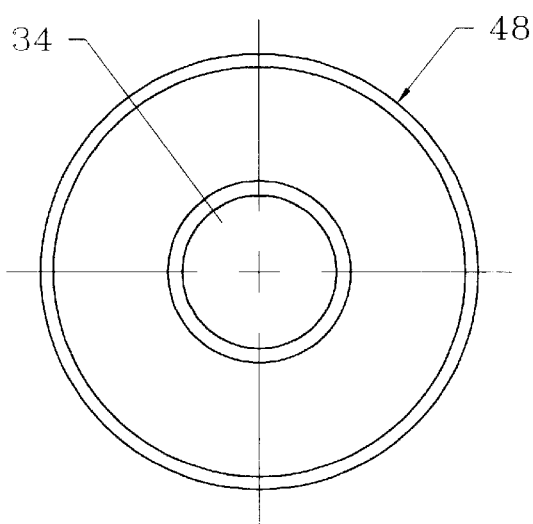
FIG. 12 shows a front view of a funnel shaped adaptation used to reduce the size of a conventional light source to a much smaller size or diameter.
Figure 13:
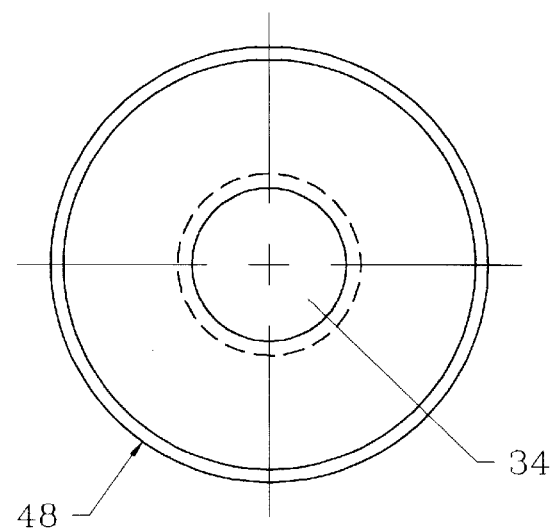
FIG. 13 shows a rear view of a funnel shaped adaptation used to reduce the size of a conventional light source to a much smaller size or diameter.

FIG. 11 shows side, bottom and top views, FIG. 12 shows a front view and FIG. 13 shows a rear view of a single unit of prototype test model utilizing a non-transparent funnel-shaped body 48 to direct the headlight 52 illumination into an inner cylinder diffusive lens 34' and thereby eliminating outer cylinder lens 36. With this arrangement, the light from the headlight 52 is directed toward and passes through the diffusive lens 34'. Thus, oncoming traffic will only see the diffused light emanating from the lens 34'. The lens 34' can be made to fit snugly in the small opening of the body 48 without permanent adhesives so that lenses of varying degrees of diffusivity can be used and easily interchanged for adapting to different environments.

Should the headlight 52 be reduced in size, the funnel-shaped body of the prototype test model can be eliminated.

With a headlight 52 reduced in size, inner cylinder lens 34 can be any shape or size to match any shape or size headlight 52.

Figure 14:
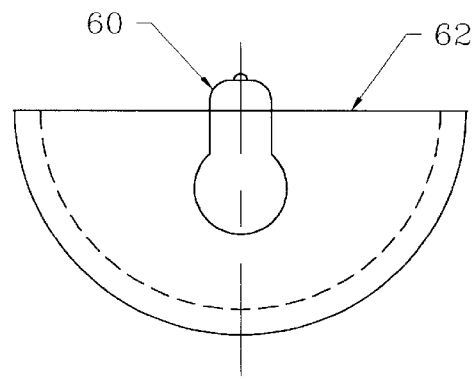
FIG. 14 shows a cutaway side view of a modification of a light glare reducing device adapted to a street light or other light source.
Figure 15:
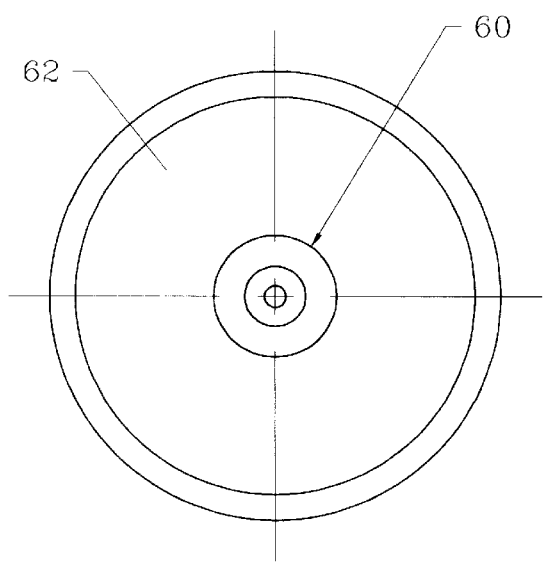
FIG. 15 shows a top view of a modification of a light glare reducing device adapted to a street light or other light source.
Figure 16:
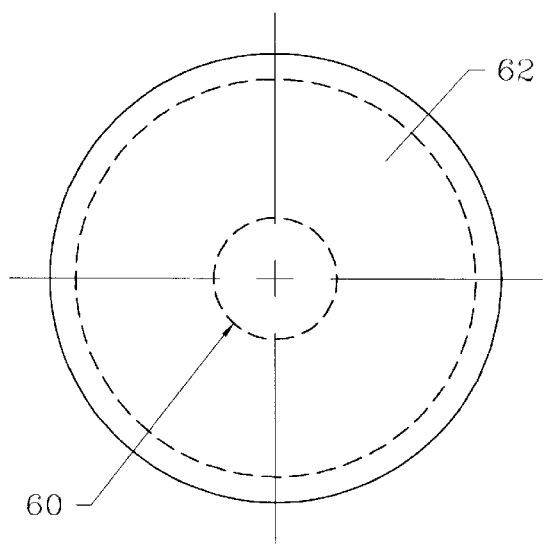
FIG. 16 shows a bottom view of a modification of a light glare reducing device adapted to a street light or other light source.

FIG. 14 shows a cutaway side view, FIG. 15 shows a top view and FIG. 16 shows a bottom view of a modification of a light glare reducing device adapted to a street light or other light source. The device includes a light bulb 60 and a light reflector shield 62 for directing light through the light glare reducing portion. A modification of a light glare reducing device adapted to a street light or other light source could be turned sideways, upside down or any combination of same due to its sealed construction. Other light sources would include and not be limited to spot lights, utility lights and household light bulbs.

Prototype test model 40 or similar models could be adapted to fit and to be attached to any household, business or public use spotlight.

Since certain changes may, can and will be made in the above construction and different embodiments of the invention and could be made without departing from the scope of the invention herein involved, it is intended that all matter contained in the above description or shown in the accompanying drawings shall be interpreted as illustrative and not in a limiting sense.

Light glare and light projections or illumination would very depending upon any and all changes in suspension solutions or mixtures of particle or substance suspending material and by any and all changes in illumination sources or headlights 52 and light glare and light projections or illumination could change by any and all changes or modifications in designs.

OPERATION OF INVENTION

The light glare reducing device demonstrates the feasibility of a low glare headlight for automotive usage and low glare feasibility for other lights.

The high glare of current automotive headlights 52 is not present with this light glare reducing device. The blinding effect to approaching drivers is reduced. The blinding effect to bicyclists, pedestrians, animals and all others is reduced.

In the light glare reducing device the center direct bulb illumination of the front side of the filament is directed into inner cylinder 30 along with some of the reflective light from the center rear portion of the reflective inside surface.

The outside area of the reflective inside surface reflects light from the bulb toward and into outer cylinder 32.

A diffusive light transmitting solid lens or lenses of a suspension solution or mixture of particle or substance suspending material in inner cylinder compartment 44 and in outer cylinder compartment 46 cuts or reduces the light glare effects of headlight 52 units much as a cloud will cut the glare of the sun. The total output of the light is reduced just as the brightness of the sun is reduced by a cloud. Therefore a brighter bulb or headlight 52 is required when projected through this invention to obtain the same amount of illumination.

The brightness of any headlight 52 has to be measured at the front of the lens or lenses and not by the headlight 52 alone.

Since certain changes may, can and will be made with resulting improvements in a diffusive light transmitting suspension suspended transmitting solid lens or lenses of a suspension solution or mixture of particle or substance suspending material without departing from the scope of the invention herein involved a one compartment light glare reducing device could result for automotive headlight 52 and other spotlight usages as could be used for a light bulb 60.

A low glare light can be obtained from the following combinations;

(a) an inner cylinder lens 34 made from a mixture of eight ounces of polyester resin with hardener or catalyst added, resin solution UN 1866 by Mahogany Co. of Mays Landing, Inc., 5450 Atlantic Ave., Mays Landing, N.J. or an equivalent, and one-quarter teaspoon of liquid concentrated ultra CHEER with advanced color guard free, a household laundry detergent made by Proctor & Gamble, Cincinnati, Ohio 45202 or equivalent. The mixture is mixed well, poured into a mold to a thickness of one and one-quarter inches and allowed to harden.

(b) an inner cylinder lens 34 made from a mixture of eight ounces of polyester resin with hardener or catalyst added, resin solution UN 1866 by Mahogany Co. of Mays Landing, Inc., 5450 Atlantic Ave., Mays Landing, N.J. or an equivalent, and one-eighth teaspoon of liquid concentrated ultra Cheer with advanced color guard free by Proctor & Gamble, Cincinnati, Ohio 45202 or equivalent. The mixture is mixed well, poured into a mold to a thickness of two and three-quarter inches and allowed to harden.

(c) an inner cylinder lens 34 made from a mixture of eight ounces of polyester resin with hardener or catalyst added, resin solution UN 1866 by Mahogany Co. of Mays Landing, Inc., 5450 Atlantic Ave., Mays Landing, N.J. or an equivalent and one-eighth teaspoon of liquid concentrated ultra Cheer with advanced color guard free by Proctor & Gamble, Cincinnati, Ohio 45202 or equivalent. The mixture is mixed well, poured into a mold to a thickness of three and three-eights inches and allowed to harden.

(d) an outer cylinder lens 36 made from a mixture of eight ounces of polyester resin with hardener or catalyst added, resin solution UN 1866 by Mahogany Co. of Mays Landing, Inc., 5450 Atlantic Ave., Mays Landing, N.J. or an equivalent, and one-quarter teaspoon of liquid concentrated ultra Cheer with advanced color guard free by Proctor & Gamble, Cincinnati, Ohio 45202 or equivalent. The mixture is mixed well, poured into a mold to a thickness of two inches and allowed to harden.

Many other combinations of mixtures or suspended solutions as well as other containers or cylinders are sure to exist.

Since certain changes may, can and will be made in the above solutions or diffusive light transmitting solid lens or lenses of a suspension solution or mixture of particle or substance suspending material without departing from the scope of the invention herein involved, it is intended that all matter contained in the above solution descriptions and solutions shall be interpreted as illustrative and not in a limiting sense.

The automotive headlight lens when used with a General Electric 4537-2, 12 volt, 100 watt sealed beam or equivalent substanially reduces the glare of the 4537-2 light source below the glare from a 4001 high beam, sealed beam from a four headlight automotive system.

The light or illumination is also reduced. When used in multiple units of four to six units of 4537-2 sealed beams with lenses the light or illumination is increased to a level adequate to safely drive a motor vehicle while maintaining a reduced glare level as compared to a standard two light low beam headlight system.

The lens is made from a mixture of eight ounces of polyester resin with hardener or catalyst added, resin solution UN 1866 by Mahogany Co. of Mays Landing, Inc., 5450 Atlantic Ave., Mays Landing, N.J. or an equivalent, and one-quarter teaspoon of liquid concentrated ultra CHEER® with advanced color guard free, a household laundry detergent made by Proctor & Gamble, Cincinnati, Ohio 45202 or equivalent. The Mixture is mixed well, poured into a mold to a thickness of one and one-quarter inches and allowed to harden.

The lens can be of any size or shape as to fit the light source. With 4537-2 sealed beam the lens would be round. With rectangular or other shaped light sources the lens would be shaped to fit. Adaptations can also be made to reduce the size or change the shape between the light source and the lens.

All measurements and structural designs are subject to changes and adaptations as for example, the round shape could be changed to a rectangular shape to accommodate rectangular shaped sealed beam headlights 52. The separate units could be combined to make a single unit. The lengths used could be changed to accommodate and to best use other various suspended solutions. This product would be considered an after-market product before and after such time as vehicle manufacturers initiated the product into their designs.

One problem that currently occurs on automotive headlights 52 is that snow and ice can build up on the headlights 52 and thereby restricting the light that is available. Since the light glare reducing devices would not have the sealed beam heat to help eliminate some or all of this snow or ice, wiper blades can and should be provided to eliminate this potential problem in cold climate regions. Small wiper units similar to units now available on some cars could be used.

On current vehicles the existing headlights 52 could be maintained so that the high beams are available should driving circumstances allow their safe usage and for a backup or reserve lighting system or the new lighting system could be installed where the current headlight system exists.

The use of this product would show consideration for approaching drivers visibility.

CONCLUSION, RAMIFICATIONS AND SCOPE OF INVENTION

Thus the reader can see that the present light glare reducing device provides an improved low glare illumination device usable on any automobile or other vehicle for reducing headlight 52 glare to oncoming vehicles traveling along an adjacent path of travel as well as any and all vehicles traveling in any and all other directions as well as to bicyclists, pedestrians and animals.

The present light glare reducing device used in a single unit or in multiple units in any configuration could be adapted to fit and to be attached to any streetlight, any household, business or public use spotlight or lighting system.

The present light glare reducing device could be adapted and modified to be used with any household light bulb and other illumination devices.

Although the description above contains many specifications, these should not be construed as limiting the scope of the invention but as merely providing illustrations of some of the presently preferred embodiments of this invention. Many other variations are possible. For example, inner cylinder compartment 44 and outer cylinder compartment 46 can have other shapes, such as square, oval, triangular and so on; the two compartments could become one compartment with a light transmitting solid lens or lenses of a suspension solution or mixture of particle or substance suspending medium without departing from the scope of the invention herein involved, a one compartment light glare reducing device could result for automotive headlight 52 and other spotlight usages as could be used for a light bulb.

Glass could be used as a construction material. The invention could be mounted on a vehicle hood, inside the vehicle on the dash or attached to the underside of the roof, attached to the grill, in the grill, on the bumper, in the bumper, as a replacement of existing lighting units, etc.

Thus the scope of the invention should be determined by the appended claims and their legal equivalents, rather than by the examples given or by the embodiments illustrated.

Since certain changes may be made in the above construction and different embodiments of the invention could be made without departing from the scope thereof, it is intended that all matter contained in the above description or shown in the accompanying drawings shall be interpreted as illustrative and not in a limiting sense, and that the claims are intended to cover all changes and modifications.

It is also to be understood that the following claims are intended to cover all of the generic and specific features of the invention which as a matter of language might be said to fall there between.

Having described my invention, which I claim as new and desire to secure by Letters Patent I claim:

1. A light glare reducing device for use in conjunction with a light source for reducing glare and blinding effects of the light source the device comprising:
   a. first diffusive light transmitting medium;
   b. a first compartment with a plurality of light transmitting surfaces adapted to be placed in a path of light emitted from the light source;
   c. said first compartment being filled with said first light transmitting medium such that the first light transmitting medium is disposed between said light transmitting surfaces of the first compartment;
   d. a second diffusive light transmitting medium;
   e. a second compartment with a plurality of light transmitting surfaces adapted to be placed in a path of light emitted from the light source;
   f. said second compartment being filled with said second light transmitting medium such that the second light transmitting medium is disposed between said light transmitting surfaces of the second compartment;

g. said first and second compartments being disposed adjacent each other and said first compartment having a different diffusivity than said second compartment;

wherein at least one of the first light transmitting medium and the second light transmitting medium comprises a solid.

2. The light glare reducing device according to claim 1, wherein said solid is formed by solidifying a mixture of liquid and solid particles.

3. The light glare reducing device according to claim 2, wherein said solid is formed by solidifying a mixture of two liquids.

4. A lighting system for providing light with a reduced glare comprising:

a light source; and a light glare reducing device positioned in a path of light emitted from said light source, the light glare reducing device comprising an inner compartment and an outer compartment, the inner compartment being disposed at least partially within the outer compartment;

the inner compartment having a first light transmitting surface adjacent the light source;

the outer compartment having a second light transmitting surface adjacent the light source;

a first diffusive light transmitting medium disposed within and filling the inner compartment, said first diffusive light transmitting medium having suspended particles dispersed throughout for scattering light; and a second diffusive light transmitting medium disposed within and filling the outer compartment, said second diffusive light transmitting medium having suspended particles dispersed throughout for scattering light.

5. The lighting system according to claim 4, wherein the inner compartment is generally coaxial with the outer compartment.

6. The lighting system according to claim 5, wherein the inner compartment is cylindrical-shaped.

7. The lighting system according to claim 6, wherein the outer compartment is cylindrical-shaped.

8. A vehicular lighting system, comprising:

a headlight; and a glare reducing device positioned in a path of light emitted from the headlight, the glare reducing device comprising a first compartment, the first compartment having a first light transmitting surface disposed adjacent the headlight, the first compartment being filled with a diffusive light transmitting medium having suspended particles dispersed throughout said medium for scattering light;

wherein the glare reducing device further comprises a second compartment, the second compartment having a second light transmitting surface disposed adjacent the headlight, the second compartment being filled with a diffusive light transmitting medium having suspended particles dispersed throughout said medium for scattering light, said first and second compartments being disposed adjacent each other.

9. The vehicular lighting system of claim 8, wherein said first compartment has a different diffusivity than said second compartment.

10. The vehicular lighting system of claim 8, wherein said first compartment is disposed partially within said second compartment.

11. A lighting system for reducing glare and blinding effects of a light source, the lighting system comprising:

a light source;

a single diffusive light transmitting lens comprising a solid mass having suspended particles dispersed throughout said solid mass for scattering light; and means for placing said lens in a path of light emitted from the light source.

12. The lighting system of claim 11, wherein said suspended particles comprise a laundry detergent.

13. A reduced glare lighting system, comprising:

a light source;

a single diffusive light transmitting lens disposed in a path of light emitted from the light source, said lens comprising a solid mass having suspended particles dispersed throughout said solid mass for scattering light; and an opaque funnel-shaped body which converges from a first opening on a side facing said light source toward a second opening on a side facing away from said light source, said diffusive light transmitting lens being fitted in said second opening, said funnel-shaped body being arranged to direct light from said light source toward said diffusive light transmitting lens.

14. The reduced glare lighting system according to claim 13, wherein said diffusive light transmitting lens is sized to fit snugly in the second opening of the funnel-shaped body.

15. The reduced glare lighting system according to claim 14, wherein a plurality of interchangeable diffusive light transmitting lenses are provided, each lens having a different diffusivity for adapting to different environments.

\* \* \* \* \*